(12) United States Patent
Chong

(10) Patent No.: US 9,902,324 B2
(45) Date of Patent: Feb. 27, 2018

(54) ACTUATOR MECHANISM FOR AN ADJUSTMENT DEVICE OF A WING MIRROR AND CLUTCH ASSEMBLY THEREOF

(71) Applicant: DONGGUAN HAO YONG AUTOMOTIVE CONTROLS, LIMITED, Guangdong Province (CN)

(72) Inventor: Kyongchol Chong, Guangdong Province (CN)

(*) Notice: Subject to any disclaimer, the term of this patent is extended or adjusted under 35 U.S.C. 154(b) by 167 days.

(21) Appl. No.: 15/068,653

(22) Filed: Mar. 14, 2016

(65) Prior Publication Data

US 2016/0265635 A1 Sep. 15, 2016

(30) Foreign Application Priority Data

Mar. 13, 2015 (KR) ................. 10-2015-0035012

(51) Int. Cl.
*B60R 1/062* (2006.01)
*F16D 7/02* (2006.01)
*B60R 1/066* (2006.01)
*B60R 1/072* (2006.01)
*F16D 41/20* (2006.01)
*F16H 19/00* (2006.01)

(52) U.S. Cl.
CPC ............ *B60R 1/062* (2013.01); *B60R 1/066* (2013.01); *B60R 1/072* (2013.01); *F16D 7/022* (2013.01); *F16D 41/206* (2013.01); *F16H 19/001* (2013.01)

(58) Field of Classification Search
CPC ......... B60R 1/062; B60R 1/072; B60R 1/066; F16D 7/022; F16D 41/206; F16H 19/001
See application file for complete search history.

(56) References Cited

U.S. PATENT DOCUMENTS

| 2006/0102459 A1* | 5/2006 | Ottolini | F16D 7/022 |
| | | | 200/400 |
| 2011/0194203 A1* | 8/2011 | Foote | B60R 1/062 |
| | | | 359/876 |
| 2016/0264055 A1* | 9/2016 | Chong | B60R 1/072 |
| 2017/0088054 A1* | 3/2017 | Casals | B60R 1/074 |

* cited by examiner

*Primary Examiner* — David J Hlavka
(74) *Attorney, Agent, or Firm* — Prakash Nama; Global IP Services, PLLC

(57) ABSTRACT

A clutch assembly is connected between a gear set connected to a driving motor of an actuator mechanism of a wing mirror and a ring gear connected to an adapter, and includes a clutch gear meshing with an extremity of the gear set, a pinion gear, and left-handed and right-handed clutch springs. The clutch gear defines a groove in an inner circumference. The pinion gear includes a gear portion meshing with the ring gear, and a clutch holding surface integrally formed with the gear portion. The left-handed and right-handed clutch springs are fitted about the clutch holding surface and are coiled on the clutch holding surface in two opposite directions. Each of the left-handed and right-handed clutch springs includes a protrusion engaged in the groove.

5 Claims, 5 Drawing Sheets

ACTUATOR MECHANISM FOR AN ADJUSTMENT DEVICE OF A WING MIRROR AND CLUTCH ASSEMBLY THEREOF

BACKGROUND OF THE INVENTION

The present invention relates to wing mirrors and, more particularly to an actuator mechanism for an adjustment device of a wing mirror.

Currently, to enable a driver to easily observe traffic situation around a rear side of an automobile, wing mirrors are mounted to both sides of the automobile and in front of front doors of the automobile. A wing mirror assembly includes a housing, a wing mirror located at a side of the housing and angularly adjustable, and an adjustment device mounted in the housing to adjust an angle of the wing mirror. The adjustment device generally includes a power-actuator unit driven by a power source to adjust the angle of the wing mirror, and a manual-actuator unit to manually adjust the angle of the wing mirror. Nowadays, the adjustment device includes a clutch assembly which can be driven by a power source and a manual mode to adjust the angle of the wing mirror.

A Korean patent with register No. 10-0585997, which is named "Clutch Structure of Automotive Mirror Adjustment Mechanism", applied in Nov. 10, 2003, and registered in May 25, 2006, discloses a clutch structure. The clutch structure includes a clutch driving gear, a pinion gear, and a spring pin. The clutch driving gear has an outer surface where a teeth portion is formed, and a concentric portion where a chuck is formed. The chuck is divided into sections in a circumferential direction by a plurality of slits. A donut-shaped groove is formed between the teeth portion and the chuck. The clutch driving gear is engaged with an output shaft of a driving motor through a predetermined gear train. The pinion gear has an end where a protrusion is formed. The protrusion is fitted on an inner surface of the chuck of the clutch driving gear, and engaged with a rack teeth portion formed at one side surface of an adjustment member. The spring pin is inserted into the donut-shaped groove of the clutch driving gear, and applies deflection forces in a radial direction such that frictional contact and slip movement occur on the contact surface between the chuck of the clutch driving gear and the protrusion of the pinion gear.

However, the above-mentioned clutch structure adopts surface friction and easily wears out because of continuous use or prolonged use, thereby reducing a service life. Moreover, the above-mentioned clutch structure cannot achieve fine adjustment of a clutch force.

Prior art document: patent document, Korean Patent No. 10-0623330 (application date: Dec. 16, 2003).

BRIEF SUMMARY OF THE INVENTION

Therefore, an actuator mechanism with a clutch assembly is provided, which utilizes both of an electric motor and a manual mode to adjust an angle of a wing mirror, thereby favoring fine adjustment of a clutch force and reducing friction of the clutch assembly to increase a service life of the clutch assembly.

According to the present invention, a clutch assembly is connected between a gear set connected to a driving motor of an actuator mechanism of a wing mirror and a ring gear connected to an adapter, and includes a clutch gear meshing with an extremity of the gear set, a pinion gear, and left-handed and right-handed clutch springs. The clutch gear defines a groove in an inner circumference. The pinion gear includes a gear portion meshing with the ring gear, and a clutch holding surface integrally formed with the gear portion. The left-handed and right-handed clutch springs are fitted about the clutch holding surface and are coiled on the clutch holding surface in two opposite directions. Each of the left-handed and right-handed clutch springs includes a protrusion engaged in the groove.

According to an embodiment, the pinion gear defines an annular guiding slot between the gear portion and the clutch holding surface, the clutch holding surface and a portion of the pinion gear defining the guiding slot are located in an inner side of the clutch gear and bounded by the inner circumference, a projection extends from the inner circumference of the pinion gear, and is slidably engaged in the guiding slot to allow the pinion gear to rotate relative to the clutch gear, the left-handed and right-handed clutch springs are located between the clutching holding surface and the inner surface of the clutch gear.

According to an embodiment, an end of the pinion gear at the clutch holding surface is stepped to form a blocking portion, to prevent the left-handed and right-handed springs from disengaging from the pinion gear.

According to an embodiment, cross-sections of the left-handed and right-handed clutch springs are square.

In addition, according to the present invention, an actuator mechanism for an adjustment device of a wing mirror for adjusting an angle of an adapter connected to the wing mirror is provided. The actuator mechanism includes a driving motor, a reduction gear set connected to the driving motor, a clutch assembly meshing with the reduction gear set, and a ring gear meshing with the clutch assembly. The reduction gear set includes a first worm formed on an output shaft of the driving motor, a worm gear meshing with the first worm, and a second worm coaxial with the worm gear. The clutch assembly includes a clutch gear meshing with the second worm, a pinion gear, and left-handed and right-handed clutch springs. The clutch gear accepts a rotation force from the reduction gear set to drive the ring gear in response to the driving motor operating to adjust the angle of the wing mirror, and disconnects a force connection between the reduction gear set and the ring gear in response to manually adjusting the angle of the wing mirror. The clutch gear defines a groove in an inner circumference of the clutch gear. The pinion gear comprises a gear portion meshing with the ring gear and a clutch holding surface integrally formed with the gear portion. The left-handed and right-handed clutch springs are fitted about the clutch holding surface and are coiled on the clutch holding surface in two opposite directions. A protrusion extends from each of the left-handed and right-handed clutch springs and engages in the groove.

Because of adopting the technical solutions, the present invention has at least the following beneficial effects. The clutch assembly utilizes left-handed and right-handed clutch springs to finely adjust the clutch force. The surface friction of the present invention is decreased to obtain a long service life. The clutch assembly has a simple installation structure and requires a less installation space, thereby obtaining a compact wing mirror assembly. In addition, according to the present invention, the clutch assembly can help to reduce manufacturing costs.

Other objects, advantages, and novel features of the invention will become more apparent from the following detailed description when taken in conjunction with the accompanying drawings.

DETAILED DESCRIPTION OF THE INVENTION

It should be noted that, without conflict, examples of the present application and the features of the examples can be combined with each other, the present invention will be described in further detail accompanying with the drawings and the following embodiments.

The following examples are described as skilled in the art to be able to fully convey the concept of the present invention. Thus, the present invention is not limited to the embodiments described below, and can be specific in other forms. Furthermore, for convenience, the drawings can be exaggerated to show constituent width, length, thickness, etc.

Figure 1:
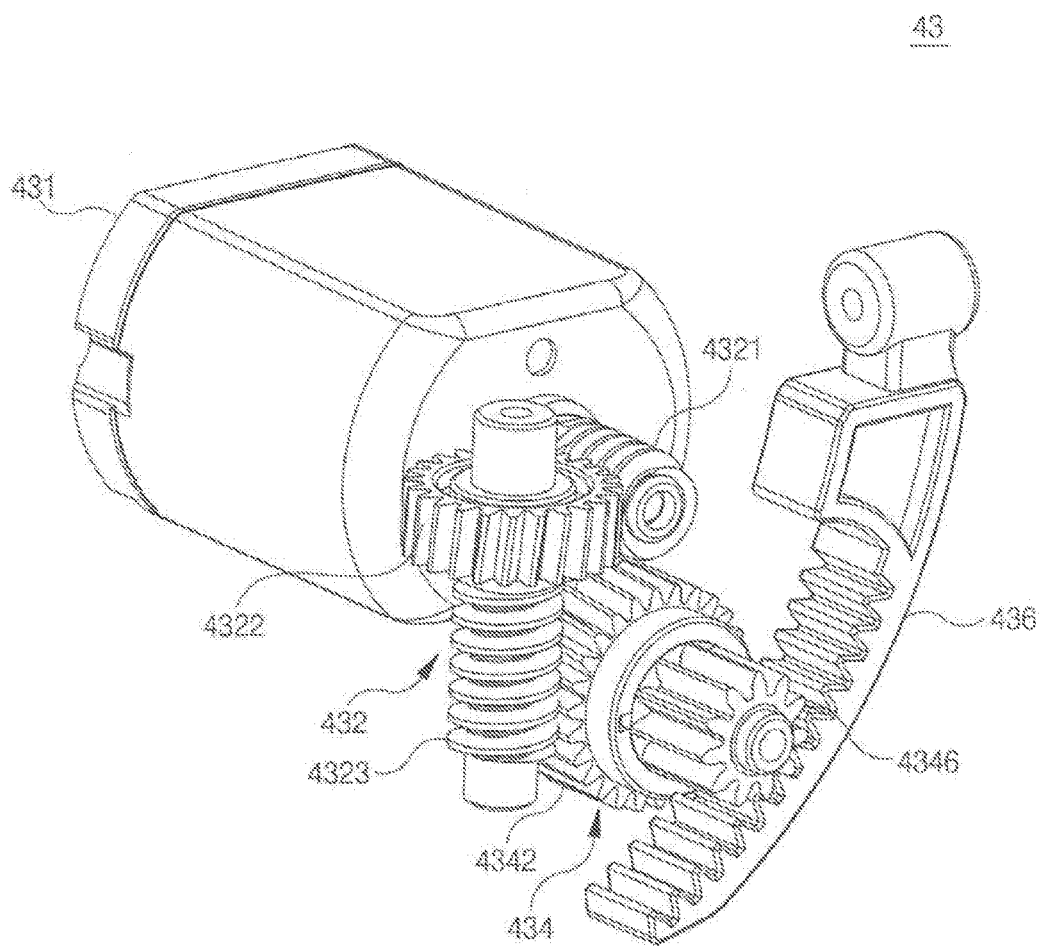
FIG. 1 is an assembled, isometric view of an actuator mechanism including a clutch assembly of an embodiment of the present invention.
Figure 2:
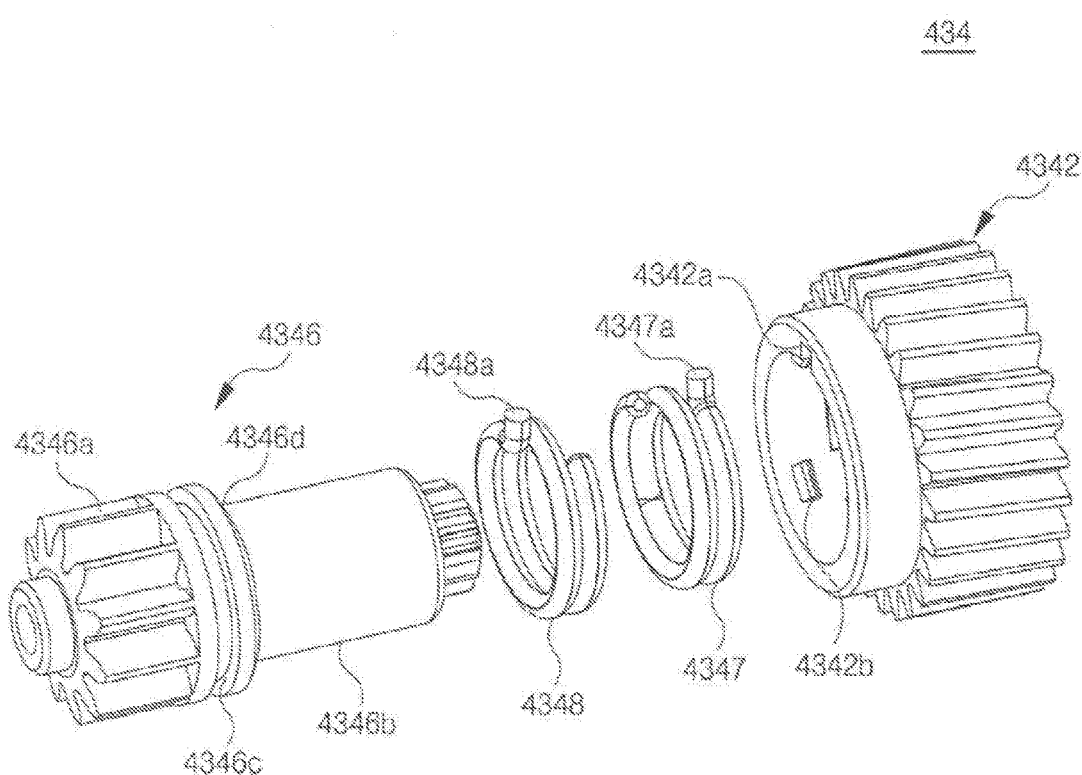
FIG. 2 is an exploded, isometric view of the clutch assembly of FIG. 1.
Figure 3:
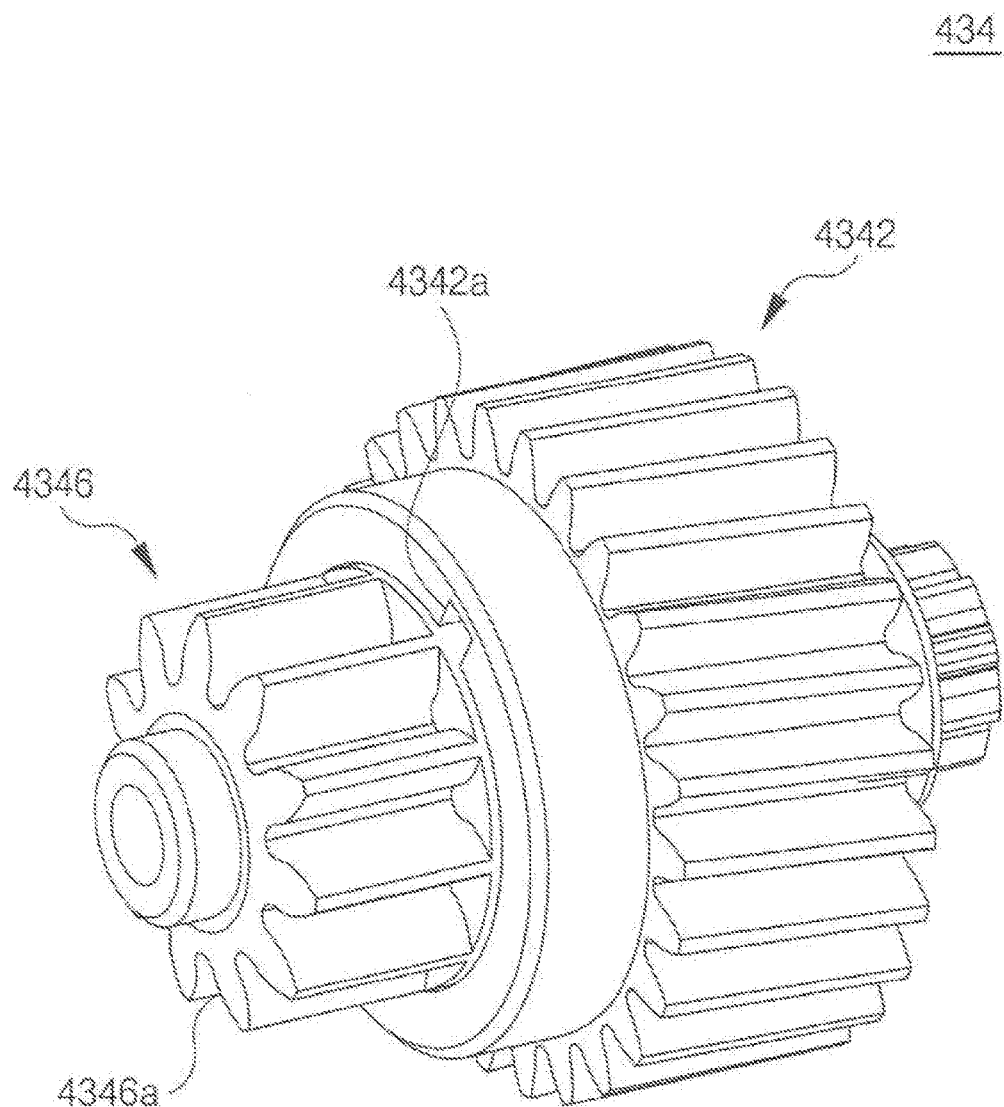
FIG. 3 is an assembled view of FIG. 2.
Figure 4:
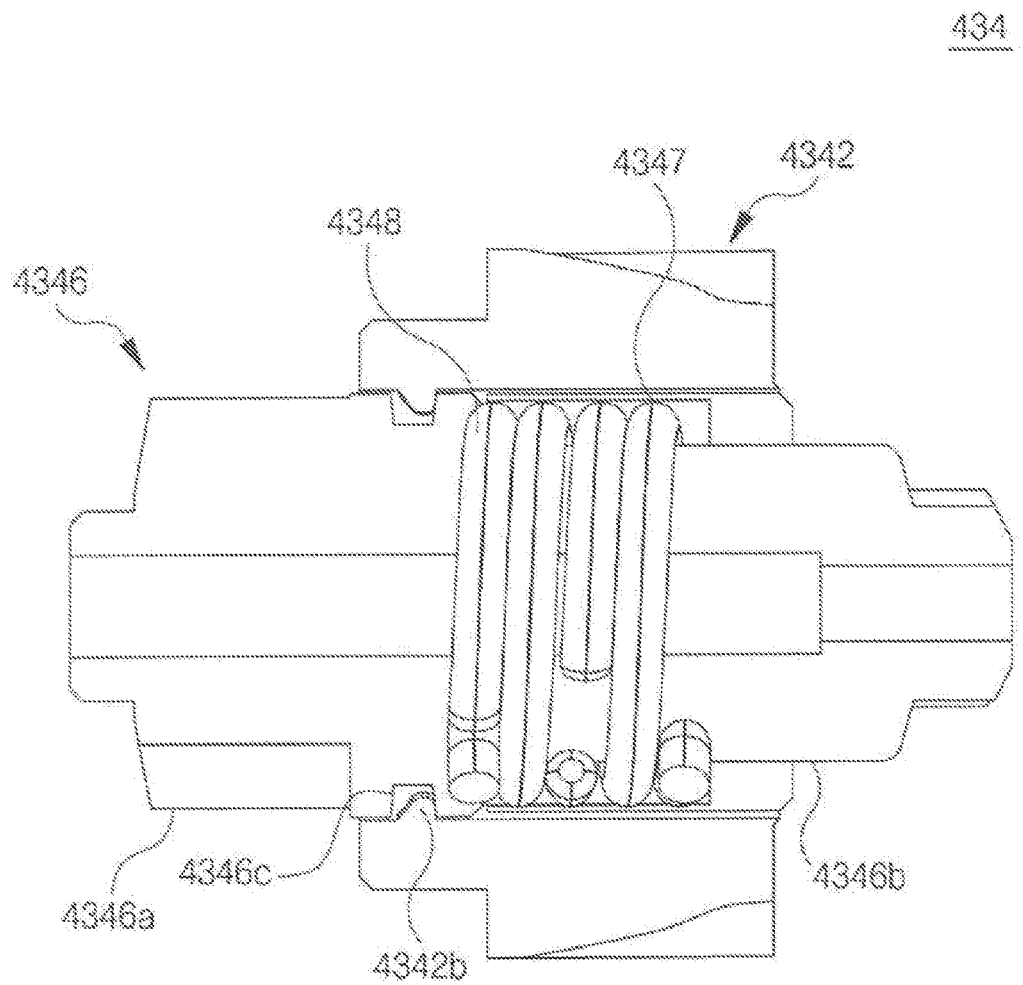
FIG. 4 is a cross-sectional view of FIG. 3.
Figure 5:
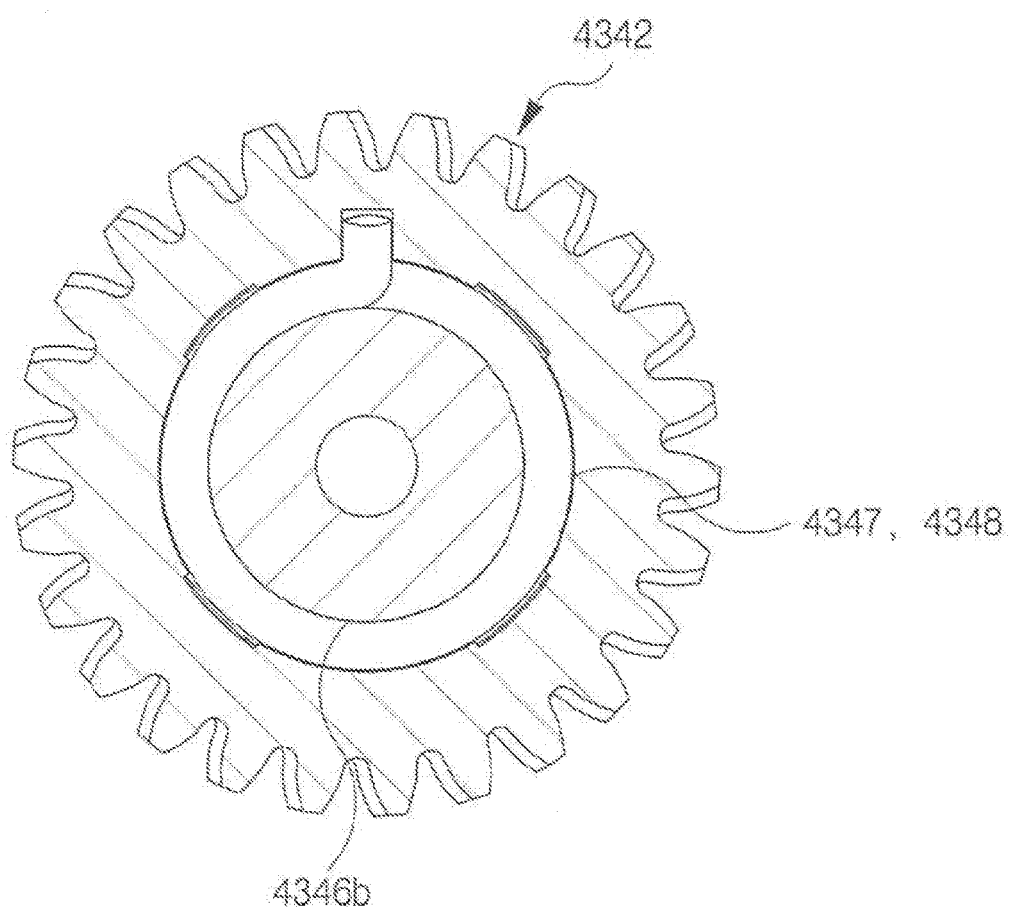
FIG. 5 is another cross-sectional view of FIG. 3.

Referring to FIG. 1, an embodiment of an actuator mechanism 43 for an adjustment device of a wing mirror includes a driving motor 431, a reduction gear set 432 for decelerating an axis rotation of the driving motor 431 and outputting a decelerated rotation in another direction different from the axis rotation, a clutch assembly 434 meshing with the reduction gear set 432, and a ring gear 436 connected to an adapter (not shown) mounted to the wing mirror.

The actuator mechanism 43 is located between an upper shell (not shown) and a lower shell (not shown), together with another actuator mechanism, to form a pair of actuator mechanisms. The actuator mechanism 43 includes an output end to allow the adapter mounted to the output end to revolve about a first axis. In the embodiment, the output end of the actuator mechanism 43 is a top end of the ring gear 436. The another actuator mechanism 43 allows the adapter to revolve about a second axis perpendicularly intersecting with the first axis. Therefore, the adapter can revolve in a fore-and-aft direction and a left-and-right direction, allowing an angle of the wing mirror to be adjusted in the fore-and-aft direction and the left-and-right direction.

The reduction gear set 432 not only can decelerate the rotation of the driving motor 431 but also can change the rotation direction from about a horizontal direction to about a vertical direction. In the embodiment, the reduction gear set 432 includes a first worm 4321 formed on an output shaft of the driving motor 431, a worm gear 4322 meshing with the first worm 4321, and a second worm 4323 integrally and coaxially formed with the worm gear 4322.

Furthermore, the clutch assembly 434 is connected between the reduction gear set 432 and the ring gear 436. The working principle of the clutch assembly 434 is that when the driving motor 431 operates to adjust the angle of the wing mirror, the driving motor 431 drives the reduction gear set 432 to rotate, thereby driving the ring gear 436 to rotate through the clutch assembly 434 and driving the adapter connected to the ring gear 436 to revolve, while when manually adjusting the angle of the wing mirror, the force connection between the reduction gear set 432 and the ring gear 436 is disconnected, thereby allowing manual adjustment and protecting the driving motor 431.

Referring to FIGS. 2-5, the clutch assembly 434 includes a clutch gear 4342, a pinion gear 4346, a left-handed clutch spring 4347, and a right-handed clutch spring 4348. The clutch gear 4342 is cylindrical, and has an outer circumference where a teeth portion is formed to mesh with the second worm 4323 of the reduction gear set 432, and an inner circumference defining a groove 4342a extending along a direction parallel to an axis of the clutch gear 4342. The pinion gear 4346 includes a gear portion 4346a meshing with the ring gear 436, and a clutch holding surface 4346b integrally formed with the gear portion 4346a. The left-handed clutch spring 4347 and the right-handed clutch spring 4348 are fitted about the clutch holding surface 4346b and coiled on the clutch holding surface 4346b in two opposite directions. The left-handed clutch spring 4347 includes a protrusion 4347a extending from an end of the left-handed clutch spring 4347. The right-handed clutch spring 4348 includes a protrusion 4348a extending from an end of the right-handed clutch spring 4348. The protrusions 4347a and 4348a are engaged in the groove 4342a.

A circumference of the pinion gear 4346 defines an annular guiding slot 4346c between the gear portion 4346a and the clutch holding surface 4346b. More specifically, a cylindrical portion of the pinion gear 4346 forming the clutch holding surface 4346b and the guiding slot 4346c are located in an inner side of the clutch gear 4342 bounded by the inner circumference of the clutch gear 4342. A projection 4342b extends from the inner circumference of the clutch gear 4342. The projection 4342b is slidably engaged in the guiding slot 4346c of the pinion gear 4346, thus, the pinion gear 4346 is rotatably mounted to the clutch gear 4342. The left-handed clutch spring 4347 and the right-handed clutch spring 4348 form a pair of clutch springs, are located between the inner circumference of the clutch gear 4342 and the clutch holding surface 4346b of the pinion gear 4346, and are fitted about the clutch holding surface 4346b and coiled on the clutch holding surface 4346b in the opposite directions. An end of the pinion gear 4346 at the clutch holding surface 4346b has a stepped structure to form a blocking portion 4346d on an end surface of the clutch holding surface 4346b. The blocking portion 4346d can prevent a spring set including the left-handed clutch spring 4347 and the right-handed clutch spring 4348 from being disengaged from the pinion gear 4346, and restrict the clutch springs 4347 and 4348 to unwind above a certain length to increase the length of the clutch springs 4347 and 4348.

When the clutch springs 4347 and 4348 are restricted by the blocking portion 4346d, the protrusions 4347a and 4347b of the clutch springs 4347 and 4348 are engaged in the groove 4342a of the clutch gear 4342. Therefore, the clutch springs 4347 and 4348 are rotated together with the clutch gear 4342 to carry out the force function of connecting the clutch gear 4342 and the pinion gear 4346.

The clutch springs 4347 and 4348 coiled in two opposite directions can more finely adjust a clutch force accompanying with the rotation of the clutch assembly 434. That is, when the clutch assembly 434 rotates to the left, the left-handed clutch spring 4347 is in the winding status and strongly holds the clutch holding surface 4346b, thereby increasing the clutch force; and on the other hand, the right-handed clutch spring 4348 is in the unwinding status and rotates with a small force, thereby maintaining force balance of each other. Conversely, when the clutch assembly 434 rotates to the right, the right-handed clutch spring 4348 is in the winding status and strongly holds the clutch holding surface 4346b, thereby increasing the clutch force; and on the other hand, the left-handed clutch spring 4347 is in the unwinding status and rotates with a small force, thereby maintaining force balance of each other.

The clutch force can be limited through adjusting amounts of change of inside diameters, wire diameters, and numbers of windings of the clutch springs 4347 and 4348 assembled to the pinion gear 4346. Therefore, the clutch springs 4347 and 4348 become a sliding motion structure under a certain force greater than the fixing force, and the clutch springs 4347 and 4348 become a force connection connected between the pinion gear 4346 and the clutch gear 4342 through the holding force applied on the clutch holding surface 4346*b* by the clutch springs 4347 and 4348. Therefore, when the clutch gear 4342 meshes and rotates with the second worm 4323 connected to the output shaft of the driving motor 431, the pinion gear 4345 rotates together, thereby allowing the ring gear 436 meshed with the pinion gear 4345 to revolve about an axis located at a rotation center.

Cross-sections of the clutch springs 4347 and 4348 can be round, quadrilateral, or other Geometric shapes. In the embodiment, a square cross-section is preferable, which gets a greatest contact area between the clutch springs 4347 and 4348 and the clutch holding surface 4346*b*.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A clutch assembly connected between a gear set connected to a driving motor of a wing mirror actuator mechanism and a ring gear connected to an adapter, the clutch assembly comprising:
    a clutch gear meshing with an extremity of the gear set, and defining a groove in an inner circumference of the clutch gear;
    a pinion gear comprising a gear portion meshing with the ring gear, and a clutch holding surface integrally formed with the gear portion; and
    left-handed and right-handed clutch springs fitted about the clutch holding surface and coiled on the clutch holding surface in two opposite directions, each of the left-handed and right-handed clutch springs comprising a protrusion engaged in the groove.

2. The clutch assembly of claim 1, wherein the pinion gear defines an annular guiding slot between the gear portion and the clutch holding surface, the clutch holding surface and a portion of the pinion gear defining the guiding slot are located in an inner side of the clutch gear bounded by the inner circumference, a projection extends from the inner circumference of the pinion gear, and is slidably engaged in the guiding slot to allow the pinion gear to rotate relative to the clutch gear, the left-handed and right-handed clutch springs are located between the clutching holding surface and the inner circumference of the clutch gear.

3. The clutch assembly of claim 2, wherein an end of the pinion gear at the clutch holding surface is stepped to form a blocking portion, to prevent the left-handed and right-handed springs from disengaging from the pinion gear.

4. The clutch assembly of claim 1, wherein cross-sections of the left-handed and right-handed clutch springs are square.

5. An actuator mechanism for an adjustment device of a wing mirror, for adjusting an angle of an adapter connected to the wing mirror, the actuator mechanism comprising:
    a driving motor comprising an output shaft;
    a reduction gear set connected to the driving motor and comprising a first worm formed on the output shaft of the driving motor, a worm gear meshing with the first worm, and a second worm coaxial with the worm gear; and
    a clutch assembly meshing with the reduction gear set, and comprising a clutch gear meshing with the second worm, a pinion gear, and left-handed and right-handed clutch springs; and
    a ring gear meshing with the clutch assembly;
    wherein the clutch gear accepts a rotation force from the reduction gear set to drive the ring gear in response to the driving motor operating to adjust the angle of the wing mirror, and disconnects a force connection between the reduction gear set and the ring gear in response to manually adjusting the angle of the wing mirror; the clutch gear defines a groove in an inner circumference of the clutch gear; the pinion gear comprises a gear portion meshing with the ring gear and a clutch holding surface integrally formed with the gear portion; the left-handed and right-handed clutch springs are fitted about the clutch holding surface and coiled on the clutch holding surface in two opposite directions, a protrusion extends from each of the left-handed and right-handed clutch springs and engages in the groove.

* * * * *